United States Patent
Dias Correa et al.

(10) Patent No.: US 10,587,422 B2
(45) Date of Patent: Mar. 10, 2020

(54) THRESHOLDS ON SCRIPTS EXECUTABLE BY UNIFIED EXTENSIBLE FIRMWARE INTERFACE SYSTEMS

(71) Applicant: Hewlett-Packard Development Company, L.P., Houston, TX (US)

(72) Inventors: Rodrigo Dias Correa, Porto Alegre (BR); Juliano Francisco Cagnini Ciocari, Porto Alegre (BR); Reynaldo Cardoso Novaes, Novo Hamburgo (BR); Anellena Santos, Porto Alegre (BR); Karyne Mayer, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 45 days.

(21) Appl. No.: 15/763,020

(22) PCT Filed: Jan. 28, 2016

(86) PCT No.: PCT/US2016/015431
§ 371 (c)(1),
(2) Date: Mar. 23, 2018

(87) PCT Pub. No.: WO2017/131712
PCT Pub. Date: Aug. 3, 2017

(65) Prior Publication Data
US 2019/0089545 A1    Mar. 21, 2019

(51) Int. Cl.
*G06F 21/53* (2013.01)
*H04L 9/32* (2006.01)
(Continued)

(52) U.S. Cl.
CPC ............ *H04L 9/3268* (2013.01); *G06F 21/51* (2013.01); *G06F 21/53* (2013.01); *G06F 21/57* (2013.01);
(Continued)

(58) Field of Classification Search
CPC ......... G06F 21/51; G06F 21/53; G06F 21/575
See application file for complete search history.

(56) References Cited

U.S. PATENT DOCUMENTS 9,116,768 B1 * 8/2015 Sawhney .................. G06F 8/60
9,292,302 B2 * 3/2016 Sasaki .................. G06F 9/4401
(Continued)

FOREIGN PATENT DOCUMENTS

JP        2014513348 A       5/2014

OTHER PUBLICATIONS

Sinha, Sushovan, "UEFI Secure Boot in Windows 8.1", Nov. 12, 2013, Available at: < http://answers.microsoft.com/en-us/windows/forum/windows8_1-security/uefi-secure-boot-in-windows-81/65d74e19-9572-4a91-85aa-57fa783f0759?auth=1 > 27 pages.
(Continued)

*Primary Examiner* — Thaddeus J Plecha
(74) *Attorney, Agent, or Firm* — HP Inc. Patent Department (57) ABSTRACT

In an example, an apparatus compatible with a unified extensible firmware interface (UEFI) system includes a processor resource and a computer-readable storage device with a set of instructions stored thereon. In that example, the instructions are executable to cause the UEFI system to verify an integrity status of a script file and an authenticity status of the script file, analyze contents of the script file in response to a determination that the script is authentic, establish a threshold on execution of the script file based on the analysis of the contents, and execute a control program
(Continued)

concurrent with execution of the script to implement the threshold.

15 Claims, 5 Drawing Sheets

(51) Int. Cl.
    *G06F 21/57*     (2013.01)
    *G06F 21/51*     (2013.01)
    *H04L 9/30*     (2006.01)
    *H04L 29/06*     (2006.01)

(52) U.S. Cl.
    CPC .............. *G06F 21/575* (2013.01); *H04L 9/30* (2013.01); *H04L 63/0823* (2013.01); *H04L 63/126* (2013.01); *G06F 2221/034* (2013.01)

(56) References Cited

U.S. PATENT DOCUMENTS

| | | | |
|---|---|---|---|
| 10,437,998 B2* | 10/2019 | Shanmugavelayutham | G06F 21/567 |
| 2005/0235285 A1* | 10/2005 | Monasterio | G06F 9/4843 718/100 |
| 2008/0244257 A1 | 10/2008 | Vaid et al. | |
| 2009/0327741 A1 | 12/2009 | Zimmer et al. | |
| 2011/0138166 A1 | 6/2011 | Peszek et al. | |
| 2013/0104188 A1* | 4/2013 | Western | G06F 21/57 726/1 |
| 2013/0254521 A1 | 9/2013 | Bealkowski et al. | |
| 2014/0007106 A1* | 1/2014 | Weksler | G06F 9/485 718/100 |
| 2014/0250291 A1 | 9/2014 | Adams et al. | |
| 2014/0282815 A1 | 9/2014 | Cockrell et al. | |
| 2015/0074386 A1 | 3/2015 | Huang et al. | |
| 2015/0089238 A1 | 3/2015 | Lewis | |
| 2015/0193620 A1 | 7/2015 | Khatri et al. | |
| 2015/0199517 A1* | 7/2015 | Rose | G06F 21/57 726/22 |
| 2015/0319160 A1 | 11/2015 | Ferguson et al. | |
| 2017/0237682 A1* | 8/2017 | Xue | G06F 9/5038 709/226 |

OTHER PUBLICATIONS

"HP Unified Extensible Firmware Interface", Hewlett-Packard Development Company, L.P., Available at: <http://www8.hp.com/in/en/products/server-software/product-detail.html?oid=6935826> 3 pages; Jul. 31, 2015.

* cited by examiner

THRESHOLDS ON SCRIPTS EXECUTABLE BY UNIFIED EXTENSIBLE FIRMWARE INTERFACE SYSTEMS

BACKGROUND

Unified Extensible Firmware Interface (UEFI) is a specification that defines an interface between an operating system and the firmware layer. Presently manufactured computers commonly implement a UEFI system as an improvement over decades of use of the Basic Input Output System (BIOS) to manage the boot process. A UEFI system may support operations, such as diagnostics, without an operating system.

DETAILED DESCRIPTION

In the following description and figures, some example implementations of apparatus, systems, and/or methods for executing a script at a pre-boot stage are described. UEFI provides an environment where functionalities could be executed before the load of an operating system. Such operations may include, hardware diagnosis, user authentication, file and registry integrity check, firmware upgrade, anti-theft procedures, etc. IT administrators may manually determine actions in the UEFI pre-operating system environment individually at each machine.

Various examples described below relate to establishing a controllable UEFI environment to execute UEFI native scripts in a managed manner. By providing an execution environment monitored by control programs and/or limiting functionalities to predetermined primitives, a UEFI native script may be developed and loaded on applicable machines to perform pre-boot operations in a programmatic way. This may also, for example, allow for IT administrators and other end users to program custom actions in UEFI using script languages while providing fine gran control and powerful management of UEFI functionalities as well as develop new features and automate action in the pre-boot stage. A network connection may be used to remotely manage multiple systems simultaneously by setting a uniform resource locator (URL) to a server repository and then instructing the target systems to download a script (or multiple scripts) associated with their model or other configuration-specific information. In this manner, another possible benefit may be centralized, simultaneous management of multiple systems.

The terms "include," "have," and variations thereof, as used herein, mean the same as the term "comprise" or appropriate variation thereof. Furthermore, the term "based on," as used herein, means "based at least in part on."

Figure 1:
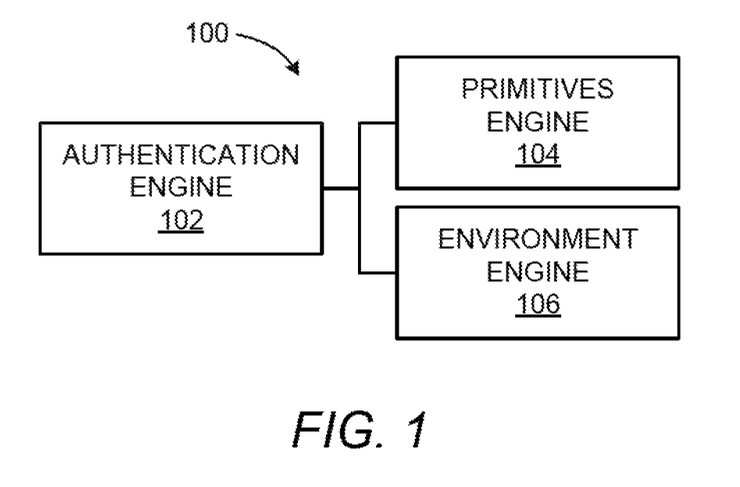
FIGS. 1 and 2 are block diagrams depicting example systems for executing a script at a pre-boot stage.
Figure 2:
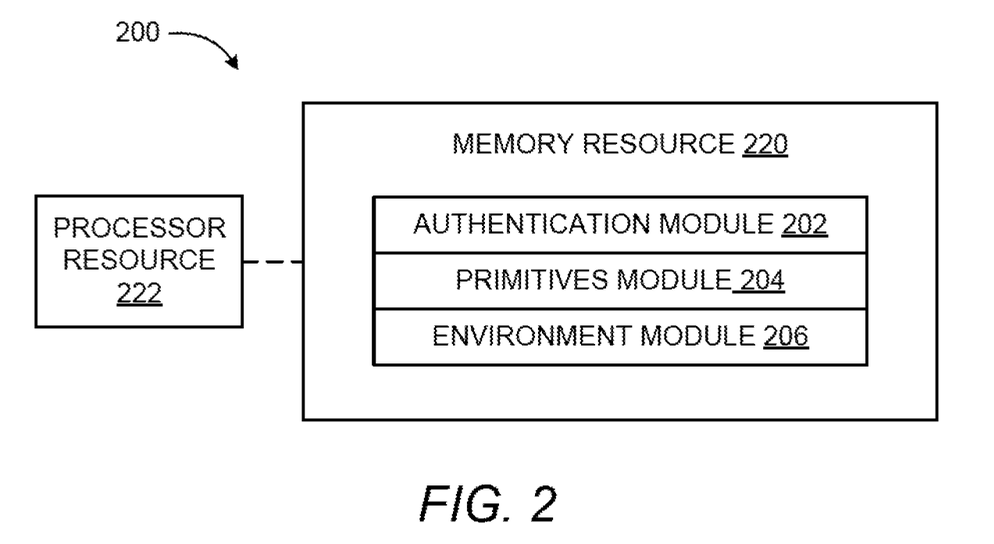

FIGS. 1 and 2 are block diagrams depicting example systems for executing a script at a pre-boot stage. Referring to FIG. 1, the example system 100 of FIG. 1 generally includes an authentication engine 102, a primitives engine 104, and an environment engine 106. In general, the primitive engine 104 may expose a set of functionalities performable by a script (authenticated by the authentication engine 102) executed in a constrained execution environment managed by the environment engine 106.

The authentication engine 102 represents any circuitry or combination of circuitry and executable instructions to determine a source of a script and an integrity level of the script. For example, the authentication engine 102 may represent a combination of circuitry and executable instructions that, upon execution of the executable instructions by the circuitry, causes the circuitry to compare a digital signature of a script with a public encryption key of a digital certificate stored on a compute device (e.g., target computer) and compare the result of a hash function over the file to a checksum checksum hash value. The authentication engine 102 may produce an integrity status and an authenticity status of the script file based on the determination (e.g., comparisons using the public encryption key and hash values). As used herein, a script file represents script program instructions that are executable on the UEFI system. The integrity status and the authenticity status may be used by the authentication engine 102 and/or the environment engine 106 to determine whether to execute the script. For example, the authentication engine 102 may verify an integrity status of a script file and authenticity status of a script file using a public encryption key and the environment engine 106 may determine not to execute the script based on the integrity status and/or the authenticity status.

The authentication engine 102 may comprise circuitry or a combination of circuitry and executable instructions to download the script from a remote server repository. For example, the authentication engine 102 may include a combination of circuitry and executable instructions that, upon execution of the instructions, causes the circuitry to provide a first interface to designate a uniform resource identifier, such as a uniform resource locator (URL) to access the server repository, provide a second interface to designate a non-volatile memory resource to store the script file, and perform a transfer of the script file from the server repository to the memory resource on the target computer (e.g., when the source of the script file is authenticated). The authentication engine 102 may comprise circuitry or a combination of circuitry and executable instructions to select the script to download from the server repository based on a target device profile where the target device profile represents a data structure that is to contain a configuration identifier of the target device associated with an attribute of the target device. Example, configuration identifiers may represent a device model, a configuration status, a resource amount, a firmware version, a capability of the device, and the like.

The primitives engine 104 represents any circuitry or combination of circuitry and executable instructions to enable a plurality of primitives to use with the script where the plurality of primitives define functionalities available via a UEFI system. For example, the primitives engine 104 may include a combination of circuitry and executable instructions that, upon execution of the instructions, cause the circuitry to allow use of a subset of operations of the UEFI by designating that subset as a plurality of primitives useable in a script to perform function calls. As used herein, a primitive is a unit of processing, such as a discrete statement or discrete data type, that represents an operation performable by a compute device or condition of execution of the operation. The operation or condition represented by the primitive may be a high-level operation that triggers multiple low-level operations such as machine instructions. For example, a script primitive may be an interpreted language statement that is processed by an interpreter to cause a set of instructions to perform by the circuitry executing the interpreter, which may involve execution of multiple target-machine specific primitives. The plurality of primitives may be used by the environment engine 106. For example, the environment engine 106 may deny execution of an operation of the script file in response to a comparison of the operation to a list of primitives allowable by the UEFI when the operation is not included within the list of permitted primitives. As used herein, a primitive represents an identifier of a type of operation and a permitted primitive represents an identifier for a type of operation that is allowed to be performed by a UEFI within an execution environment.

The environment engine 106 represents any circuitry or combination of circuitry and executable instructions to manage a script execution environment of the UEFI system. For example, the environment engine 106 may include a combination of circuitry and executable instructions that, upon execution of the instructions, cause the circuitry to execute a control program associated with the functions performed by the script to ensure the functions do not perform outside bounds of a set of execution parameters based on a set of thresholds, such as resource thresholds. The environment engine 106 may enable execution of the script during initialization (e.g., the pre-boot stage before starting an operating system) of a target device in response to a determination that the script is authenticated (e.g., based on the source and the integrity level). The environment engine 106 may establish execution parameters of the script by the UEFI system based on thresholds defined by a plurality of control programs. For example, the environment engine 106 may establish resource limitations on access by the firmware layer, such as an amount of memory used by the script or an amount of processor time used by the script. By establishing execution parameters of the UEFI system, scripts may be executed in a controlled manner to stay within operational limitations, which may, for example, increase security and operational integrity of the target system in the initialization stages, in particular the operational state of the device before selecting an operating system to boot. A device may then enter the boot stage to boot a selected operating system and the post-boot stage where the operating system is operational.

Management of the script execution environment may be done by restricting the types of functions performable and/or by monitoring access to resources of the environment. For example, the environment engine 106 may restrict execution of the script to functionalities of the plurality of primitives. For another example, the environment engine 106 may perform a check operation of the script during runtime to be within resource usage parameters (e.g., execution parameters represented as thresholds, such as a maximum or minimum amount of utilization of a resource). As used herein, a check operation may represent any determinative operation (e.g., a reviewing, parsing, and/or comparison operation) such as a reviewing of usage history, a parsing of a function call, a comparing of a function call to a previous function call, and the like. A function of a script may be executed in response to an event and/or a control program may be executed in response to an event. For example, the environment engine 106 may include circuitry or a combination of circuitry and executable instructions to identify a function call of the script to be performed in response to a particular UEFI event and execute the function in response to the UEFI event. For another example, the event may be a resource request and the control program may be initiated by the environment engine 106 in response to the request, to monitor the resource and interrupt any unauthorized request, overuse, or other misuse of the resource.

By providing a controlled environment, a script may be executed by the UEFI system to interact with the firmware layer within specific limitations for the target device. Specific control programs may protect particular resources of the target device to allow for successful execution of the script without, for example, unintended consequences that may inhibit further operation, e.g. booting, of the target device. Example script program functionalities that may be allowed in a controlled manner may include upgrading the UEFI, modifying a screen or item in the UEFI configuration interface, executing internal application programming interface (API) commands, operating a driver mechanism to load or unload a driver, performing a diagnostics check, checking an operating system integrity, accessing UEFI functions or data (such as an internal UEFI function, a UEFI environment variable, hardware inventory, a system log file, a registry value, a UEFI application, and the like).

Figure 3:
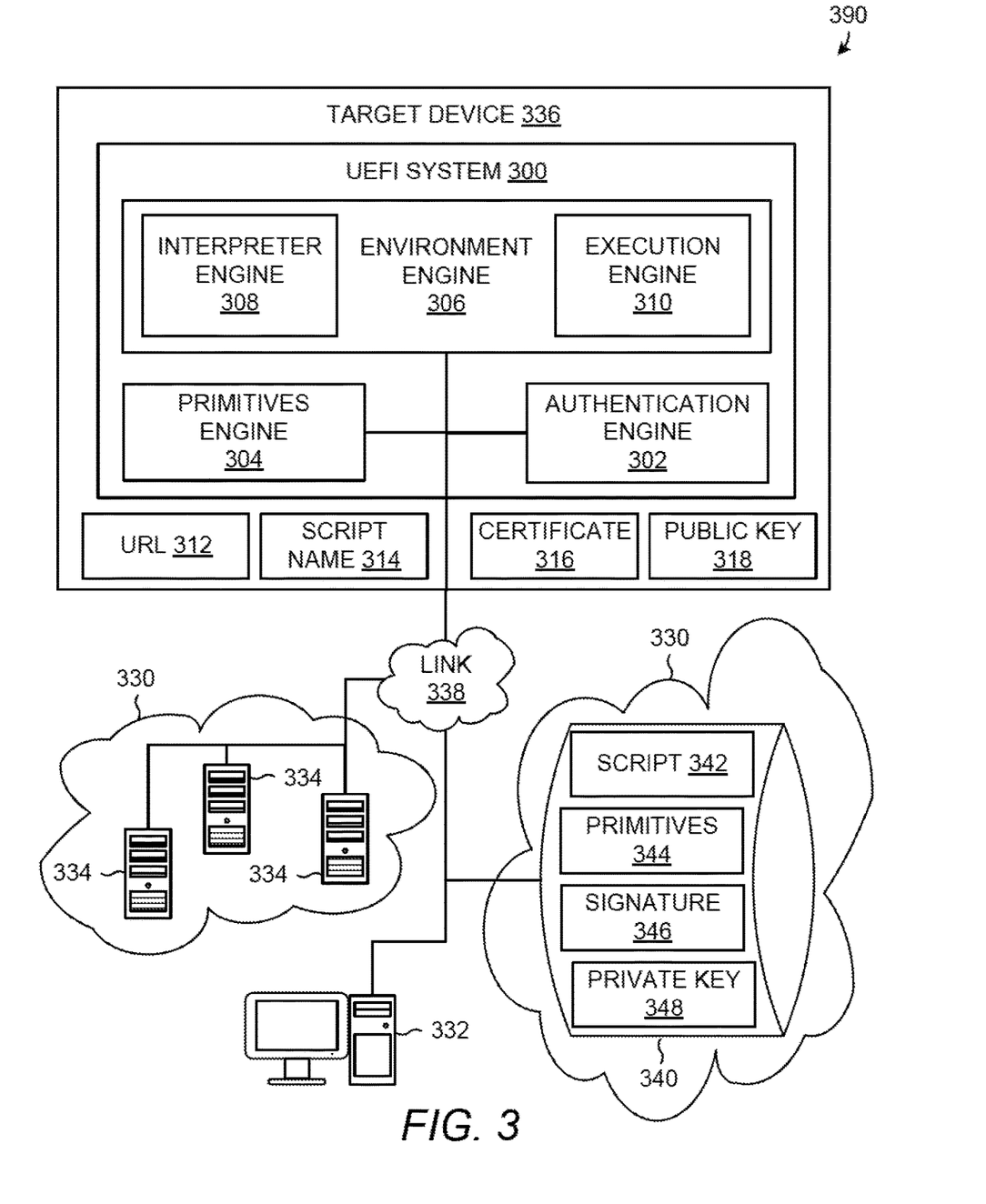
FIG. 3 depicts an example environment in which various systems for executing a script at a pre-boot stage may be implemented.
Figure 4:
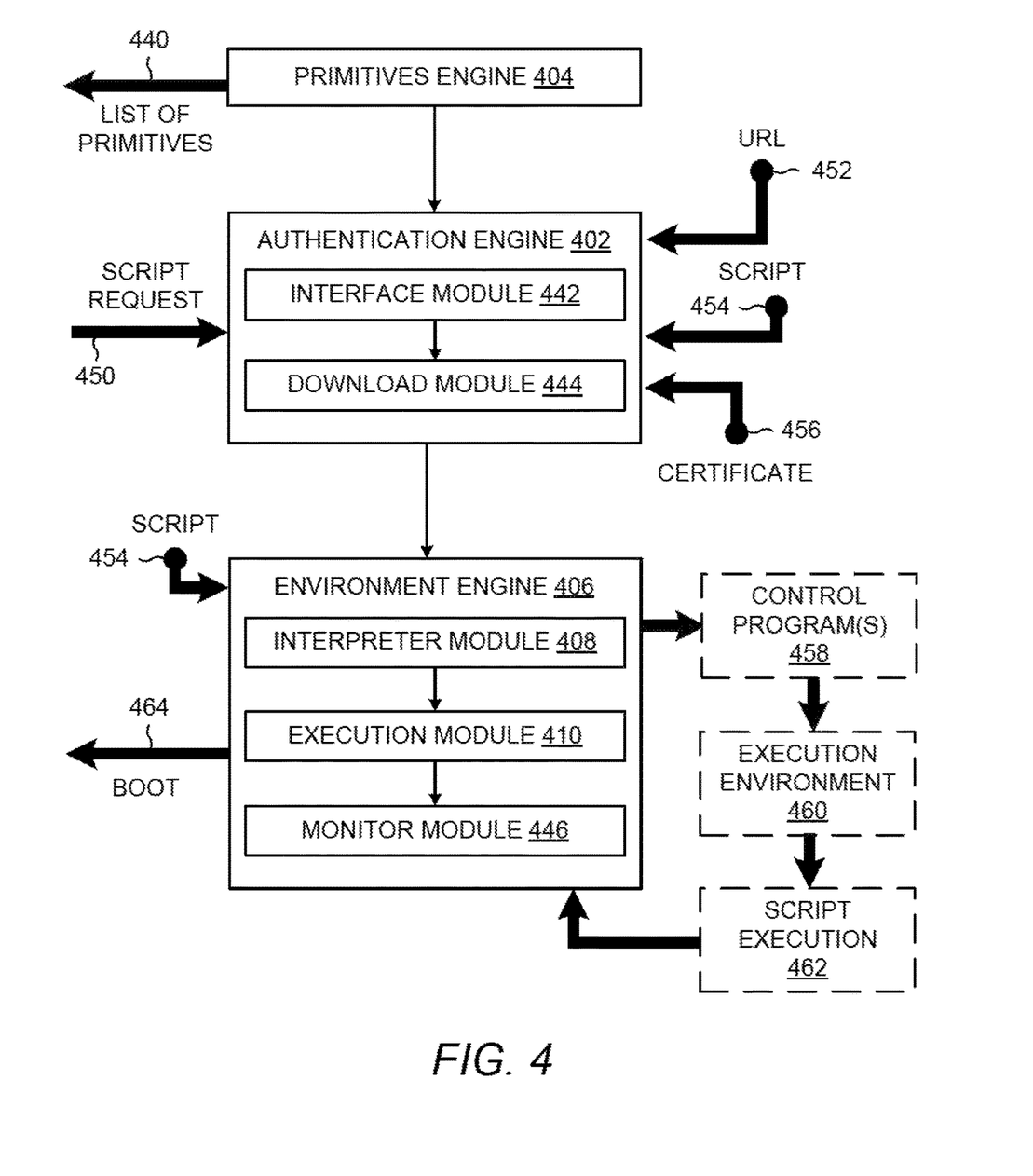
FIG. 4 depicts example operations used to implement example systems for executing a script at a pre-boot stage.
Figure 5:
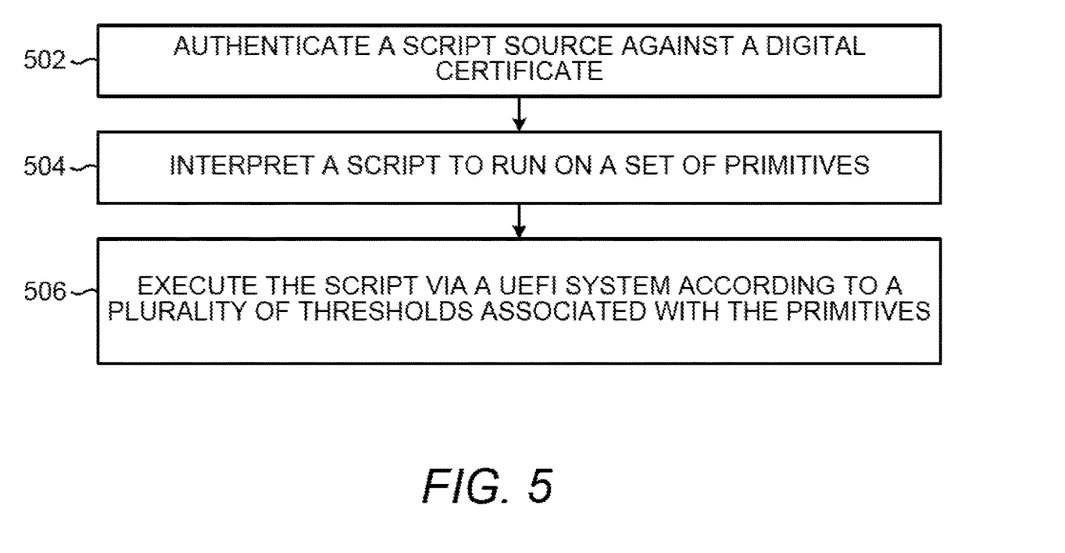
FIGS. 5 and 6 are flow diagrams depicting example methods for executing a script at a pre-boot stage.
Figure 6:
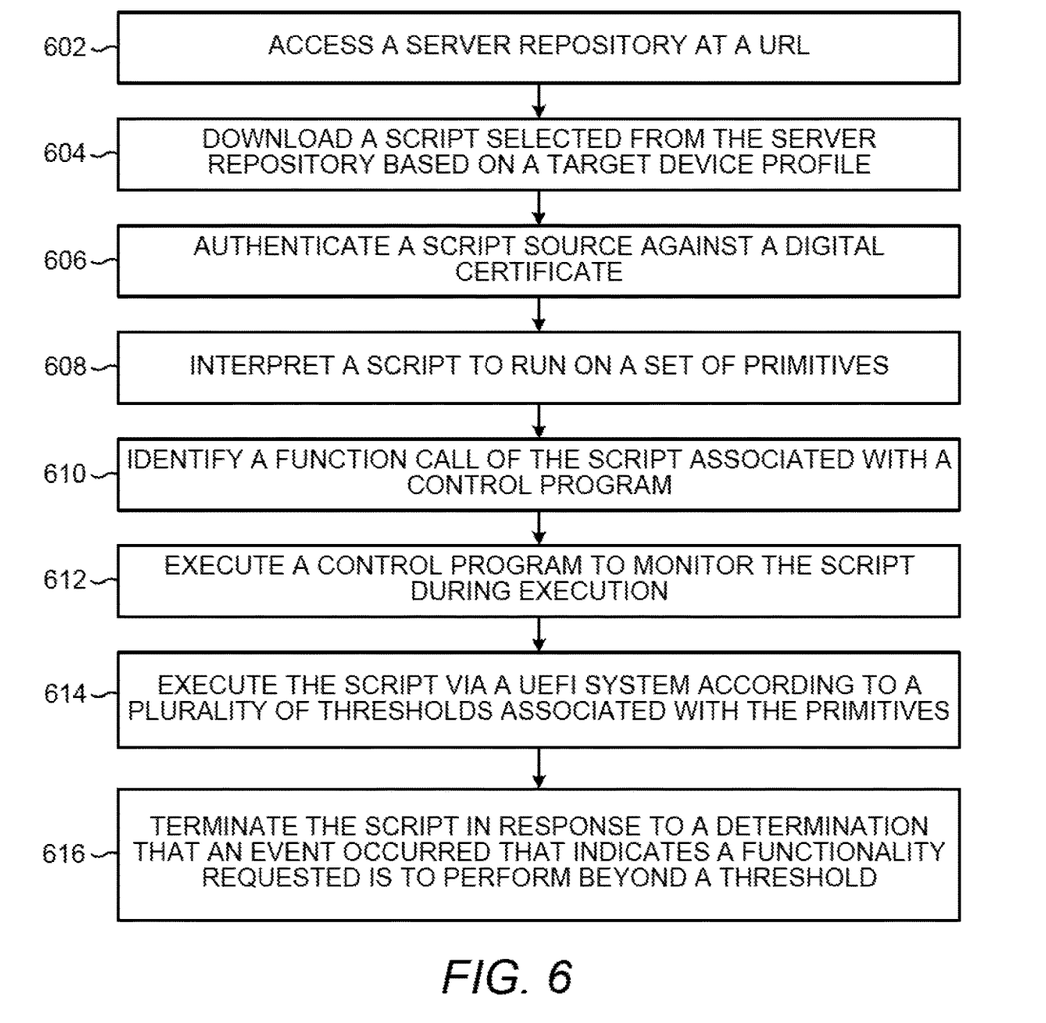

In some examples, functionalities described herein in relation to any of FIGS. 1-3 may be provided in combination with functionalities described herein in relation to any of FIGS. 4-6.

FIG. 2 depicts the example system 200 may comprise a memory resource 220 operatively coupled to a processor resource 222. Referring to FIG. 2, the memory resource 220 may contain a set of instructions that are executable by the processor resource 222. The set of instructions are operable to cause the processor resource 222 to perform operations of the system 200 when the set of instructions are executed by the processor resource 222. The set of instructions stored on the memory resource 220 may be represented as an authentication module 202, a primitives module 204, and an environment module 206. The authentication module 202, the primitives module 204, and the environment module 206 represent program instructions that when executed function as the authentication engine 102, the primitives engine 104, and the environment engine 106 of FIG. 1, respectively. The processor resource 222 may carry out a set of instructions to execute the modules 202, 204, 206, and/or any other appropriate operations among and/or associated with the modules of the system 200. For example, the processor resource 222 may carry out a set of instructions to authenticate a script source against a digital certificate, interpret a script to run on a set of primitives that represent functionalities available via the UEFI system, execute the script via the UEFI system according to a plurality of thresholds associated with the set or primitives in response to a determination that the script achieves an integrity level, and check events produced by execution of the script to identify that the script is executing within limits defined by the plurality of thresholds. For another example, the processor resource 222 may carry out a set of instructions to determine a URL from a predetermined identifier (e.g., a statically-defined identifier) or a user-provided identifier, select a script to download from a server repository based on the target device profile, download the script from the server repository via the URL, and check the script source by using a public encryption key against a digital certificate. For yet another example, the processor resource 222 may carry out a set of instructions to cancel a download operation of the script in response to a determination that the script source is not authenticated or terminate execution of the script in response to a determination that an event occurred that indicates a functionality is requested to perform beyond the thresholds. For yet another example, the processor resource 222 may carry out a set of instructions to cause a UEFI system to verify an integrity status of a script file and authenticity status of a script file using a public encryption key, analyze contents of the script file via a language interpreter in response to a determination that the script file is authentic, establish a threshold on execution of the script file based on the analysis of the contents, and execute a control program concurrent with execution of the script, the control program to implement the threshold.

Although these particular modules are illustrated and discussed in relation to FIG. 2 and other example implementations, other combinations or sub-combinations of modules may be included within other implementations and the specific functionalities and other functionalities discussed in the examples herein may be accomplished, implemented, or realized at different modules or at combinations of modules. For example, FIG. 4 depicts yet another example of how functionality may be organized into modules.

As used herein, a processor resource represents any appropriate circuitry capable of processing (e.g., computing) instructions, such as one or multiple processing elements capable of retrieving instructions from a memory resource and executing those instructions. For example, the processor resource 222 may be a central processing unit (CPU) that enables executing scripts at a pre-boot stage by fetching, decoding, and executing modules 202, 204, and 206. Examples of a processor resource include a CPU, a semiconductor-based microprocessor, a programmable logic device (PLD), and the like. Example of a PLD include an application-specific integrated circuit (ASIC), a field-programmable gate array (FPGA), a programmable array logic (PAL), a complex programmable logic device (CPLD), an erasable programmable logic device (EPLD), and the like. A processor resource may include multiple processing elements that are integrated in a single device or distributed across devices. A processor resource may process instructions serially, concurrently, or in partial concurrence.

As used herein, a memory resource represents a non-transitory medium (or combination of non-transitory media) capable of containing (i.e., storing) data (such as modules of the system 200) in a machine-readable format (e.g., a computer-readable medium). Such a medium may be an electronic, magnetic, optical, or other physical storage device that is a storage medium, which is distinct from a transitory transmission medium, such as a signal. The memory resource 220 may be a non-volatile memory resource such as read-only memory (ROM), a volatile memory resource such as random access memory (RAM), another storage device, or a combination thereof. Example forms of a memory resource 220 include a hard drive (HD), a solid state drive (SSD), an optical drive, a static RAM (SRAM) module, a dynamic RAM (DRAM) module, electrically erasable programmable ROM (EEPROM), flash memory, and the like.

In the discussion herein, the engines 102, 104, and 106 of FIG. 1 and the modules 202, 204, and 206 of FIG. 2 have been described as circuitry or a combination of circuitry and executable instructions. Such components may be implemented in a number of fashions. Looking at FIG. 2, the executable instructions may be processor-executable instructions, such as program instructions, stored on the memory resource 220, which is a tangible, non-transitory computer-readable storage medium, and the circuitry may be electronic circuitry, such as the processor resource 222, for executing those instructions. The memory resource 220 may be integrated in the same device as the processor resource 222 or it may be separate but accessible to that device and the processor resource 222.

The instructions residing on the memory resource 220 may comprise any set of instructions to be executed directly (such as machine code) or indirectly (such as a script) by the processor resource 222. In some examples, the system 200 may include executable instructions as part of an installation package that when installed may be executed by the processor resource 222 to implement functionality of the system 200, such as methods described with regards to FIGS. 4-6. In that example, the memory resource 220 may be a portable medium such as a compact disc, a digital video disc, a flash drive, or memory maintained by a computer device such as a service device 334 of FIG. 3, from which the installation package may be downloaded and installed. In another example, the executable instructions may be part of an application or applications already installed.

FIG. 3 depicts example environments in which various example systems 300 for executing a script at a pre-boot stage may be implemented. The example environment 390 is shown to include an example system 300 (described herein with respect to FIGS. 1 and 2) that represents generally any circuitry or combination of circuitry and executable instructions to execute scripts at a pre-boot stage. The system 300 may include an authentication engine 302, a primitives engine 304, and an environment engine 306 that are similar to the authentication engine 102, the primitives engine 104, and the environment engine 106 of FIG. 1, respectively, with exception that the environment engine 306 is depicted to include an interpreter engine 308, and an execution engine 310. As shown in FIG. 3, the engines 302, 304, 306, 308, and 310 may be integrated into a compute device, such as a target device 336. The engines 302, 304, 306, 308, and 310 may be integrated via circuitry or as installed instructions into a memory resource of the compute device.

As depicted in FIG. 3, the environment engine 306 may include an interpreter engine 308 and an execution engine 310. The interpreter engine 308 represents any circuitry or combination of circuitry and executable instructions to analyze script content. For example, the interpreter engine 308 may be a combination of circuitry and executable instructions that, upon execution of the instructions, cause the circuitry to execute a language interpreter to analyze contents of a script file (e.g., in response to a determination that the script file is authentic) and identify a function call in the script that is not a functionality of a list of allowed primitives. The interpreter engine 308 may be particular to a specific script language or may be able to interpret multiple script languages. The interpreter engine 308 may analyze the script file for a particular class of function calls, a particular result of a function call, a function call that utilizes a particular resource, and/or a function call that activates a particular event. For example, the interpreter engine 308 may compare an operation of the script to a list of primitives allowable by the UEFI and deny execution of the operation of the script file in response to the comparison of the operation to a list of primitives. For another example, the interpreter engine 308 may identify a function call of the script to be performed in response to a particular UEFI event and initiate a control program to monitor for the UEFI event. The interpreter engine 308 may execute a language interpreter, enable the language interpreter to access a UEFI application programming interface, and cause the language interpreter to identify whether a set of actions of the script profile match a device profile of the apparatus. The interpreter engine 308 and/or the execution engine 310 may forbid execution of the script in response to a determination that the script contains a particular function call.

The execution engine 310 represents any circuitry or combination of circuitry and executable instructions to execute a script in a managed runtime environment. For example, the execution engine 310 may be a combination of circuitry and executable instructions that, upon execution of the instructions, cause the circuitry to execute a plurality of control programs to check operation of the script during runtime to be within resource usage parameters represented by thresholds monitored by the control programs where the control programs implement the execution parameters executing concurrent with execution of the script and monitoring for a threshold condition state, such as a resource usage amount or time limit. The execution engine 310 causes modification to execution of script via control programs. For example, the execution engine 310 may terminate execution of the script in response to a determination that an event occurred that indicates a functionality is requested to perform beyond the threshold or may cause the interpreter running the script to stop the script from continuing. The execution engine 310 may run the script directly or manage running the script via the UEFI system 300. For example, the execution engine 310 may deny execution of an operation of the script file in response to a determination that the operations is to perform outside a parameter of the threshold at the interpretation stage and/or the runtime stage.

The environment 390 may be setup for compatibility with the example descriptions herein. For example, a script program 342 may be designed using desired action in a UEFI system 300 using a proper language. A digital signature 346 of the script program 342 may be generated using a private encryption key 348. The serve repository (e.g., data store 340) may be loaded with a script program 342 and the corresponding digital signature 346. The target device 336 may be loaded with a digital certificate 316 with the public encryption key 318 that corresponds to the private encryption key 348 of the digital signature 346. The target device 336 may be configured with a URL 312 of the server repository for UEFI scripts and script file name 314, for example. With those items stored in the proper locations, the target device 336 may be managed by updating or otherwise modifying the remotely stored script 342.

The target device 336 is compatible with a UEFI system 300 that is adapted to control scripts of UEFI functions, as described herein. For example, a set of instructions stored on a non-transitory computer-readable storage medium may be executed by a processor resource of the target device 336 to cause the UEFI system to verify an authenticity status and an integrity status of a script file using a public encryption key, execute a script language interpreter to analyze contents of the script file when the script file is authentic and meets an integrity check, and execute a control program concurrent with execution of the script to establish a threshold on execution of the script file based on the analysis of the contents. For another example, the set of instructions may, when executed, cause the UEFI system to check whether an appropriate URL exists on the target device 336, retrieve a script file from a repository at the URL, retrieve a digital signature from the repository at the URL, determine whether a file hash of the script is authentic, and prevent the UEFI system from executing the script in response to a determination that the file hash is not authentic or allow execution of the script in response to a determination that the file hash is authentic. For yet another example, the set of instructions may cause the UEFI system to download a script from a remote repository, enable a script language interpreter to access a UEFI application programming interface (API), execute the language interpreter to identify whether a set of actions of the script file match a device profile of the apparatus, deny execution of any operation of the script file in response to a determination that the operation is to perform outside a threshold as set by a parameter of execution, and/or deny execution of an operation of the script file in response to a comparison of the operation to a list of primitives allowable by the UEFI system.

The example environment 390 may include compute devices, such as developer devices 332, service devices 334, and client devices 336. A first set of instructions may be developed and/or modified on a developer device 332. For example, a script 342 may be developed and/or modified on a developer device 332 and stored onto a data store 340, which may be maintained by a service device 334. The service devices 334 represent generally any compute devices to respond to a network request received from a client device, such as target device 336, whether virtual or real. For example, the service device 334 may operate a combination of circuitry and executable instructions to provide a network packet in response to a request for access to a storage location. A client device represents generally any compute device to communicate a network request and receive and/or process the corresponding responses. For example, a browser application may be installed on a client device to receive the network packet from the service device 334 and utilize the payload of the packet to display an element of a page via the browser application.

The compute devices may be located on the same network 330 or separate networks 330. The example environment 390 may include any appropriate number of networks 330 and any number of the networks 330 may include a cloud compute environment that includes a virtual shared pool of compute resources. Any appropriate combination of the system 300 and compute devices may be a virtual instance of a resource of a virtual shared pool of resources. The engines and/or modules of the system 300 herein may reside and/or execute "on the cloud" (e.g., reside and/or execute on a virtual shared pool of resources).

A link 338 generally represents one or a combination of a cable, wireless connection, fiber optic connection, or remote connections via a telecommunications link, an infrared link, a radio frequency link, or any other connectors of systems that provide electronic communication. The link 338 may include, at least in part, intranet, the Internet, or a combination of both. The link 338 may also include intermediate proxies, routers, switches, load balancers, and the like.

The data store 340 may contain, information utilized by the engines 302, 304, 306, 308, and 310. For example, the data store 340 may store a script 342, a list of primitives 344, a digital certificate 346, a public encryption key 348, and the like.

Referring to FIGS. 1-3, the engines 102, 104, and 106 of FIG. 1 and/or the modules 202, 204, and 206 of FIG. 2 may be distributed across devices 332, 334, 336, or a combination thereof. The engine and/or modules may complete or assist completion of operations performed in describing another engine and/or module. For example, the environment engine 306 of FIG. 3 may request, complete, or perform the methods or operations described with the environment engine 106 of FIG. 1 as well as the authentication engine 102 and the primitives engine 104 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. In some example, the engines of the system 300 may perform example methods described in connection with FIGS. 4-6.

FIG. 4 depicts example operations used to implement example systems for executing a script at a pre-boot stage. Referring to FIG. 4, the example components of FIG. 4 generally include a primitives engine 404, an authentication engine 402, and an environment engine 406. The example components of FIG. 4 may be implemented on a compute device, such as target device 336 of FIG. 3.

The primitives engine 404 exposes a list of primitives 440 to use in a script to operate a UEFI system. For example, the primitives engine 404 may make a list available of the functions performable by the UEFI system. The environment engine 406 may restrict the performable actions allowed in a script based on the enabled functions as a managed by the primitives engine 404. A developer may generate a script 454 using the exposed primitives. The script may be loaded onto the system and authenticated or may be authenticated during a retrieval process, such as downloading the script from a remote repository. Any script language may be used, provided that the corresponding interpreter fits in the available UEFI ROM module space of the specific UEFI system.

During a pre-boot stage, a script request 450 may be generated to check for whether there are any scripts to execute. In response, to receiving the script request 450, the authentication engine 402 verifies whether a URL is loaded and then downloads a script 454 from the URL 452 (e.g., using the script file name) and a corresponding certificate 456. The authentication engine 402 may include program instructions, such as an interface module 442 and a download module 444, to facilitate access to a repository and retrieval of the script 454. The interface module 442 represents program instructions that when executed by a processor resource causes a UEFI system to establish a network connection with a repository using the URL 452 using a protocol, such as Hypertext Transfer Protocol (HTTP) or File Transfer Protocol (FTP). For example, the interface module 442 may be executed to cause a device to check if a URL is loaded in the appropriate address in an internal memory resource and may or may not perform a connection with a repository depending on whether there is a URL and/or whether there is already a script downloaded with the appropriate file name. The download module 444 represents program instructions that when executed by a processor resource cause a UEFI system to download the script file 454 from the repository at the URL 452. The authentication engine 402 causes a UEFI system to check the script file integrity and authenticity. For example, the authentication engine 402 may cause the UEFI system to use a loaded public encryption key to compare against a digital signature associated with the script file 454. If the script checks out as valid and authentic, the script may be authorized for execution by the UEFI system.

The execution engine 406 may include program instructions (e.g., the interpreter module 408, the execution module 410, and the monitor module 446) to cause execution of the script 454 in a controlled execution environment 460. The interpreter module 408 represents program instructions that when executed by a processor resource cause a language interpreter of the UEFI system to analyze the contents of the script 454. The environment engine 406 may establish control program(s) 458 to execute based on the analysis of the contents of the script file 454. The execution module 410 represents program instructions that when executed by a processor resource cause a language interpreter to cause execution of the control program(s) 458 to generate an execution environment 460 in which the script execution 462 may be performed in a manner managed by the control program(s) 458. The monitor module 446 represents program instructions of the control programs that when executed by a processor resource cause the control programs to monitor the execution environment 460 for status and make comparisons of the parameters of the execution environment to thresholds, such as resource thresholds. The program defined by the script file 454 may be completely executed in sequence or the language interpreter may define parts that are executable later, such as functionalities triggered by UEFI specific events. After the script completes execution 462 (either by completing the script or based on termination from surpassing a threshold), the UEFI system then causes a device to boot 464 with an operating system.

FIGS. 5 and 6 are flow diagrams depicting example methods for executing a script at a pre-boot stage. Referring to FIG. 5, example methods for executing a script at a pre-boot stage may generally comprise authenticating a script source against a digital certificate, interpreting a script to run on a set of primitives, and executing the script via a UEFI system according to a plurality of thresholds associated with the primitives. The method for executing a script at a pre-boot stage may performable by the engines 102, 104, and 106 of system 100, for example.

At block 502, a script source is authenticated against a digital certificate. For example, a public-private encryption scheme using a public key and a private key may be used to authenticate the source of the script prior to execution of the script via an authentication engine, such as authentication engine 102 of FIG. 1. At block 504, the script is interpreted to run on a set of primitives. For example, a subset of functionalities of a UEFI system may be permitted to be executed and a script language interpreter may verify that the script calls permissible functions (e.g., only calls permissible functions, removes impermissible functions, terminates interpretation of the script when an impermissible function is identified, etc.) made available via a primitives engine, such as primitives engine 104 of FIG. 1. At block 506, the script is executed via the UEFI system according to a plurality of thresholds associated with the set of primitives. For example, a primitive may be allowed to run via an environment engine, such as environment engine 106 of FIG. 1, and execute a functionality as long as the functionality stays within a threshold, such as an execution parameter that defines an amount of a compute resource that is allowed to be used by script execution.

FIG. 6 includes blocks similar to blocks of FIG. 5 and provides additional blocks and details. In particular, FIG. 6 depicts additional blocks and details generally regarding downloading the script from a server repository, identifying a function call of the script, executing a control program, and terminating the script. Blocks 606, 608, and 614 are the same as blocks 502, 504, and 506 of FIG. 5 and, for brevity, their respective descriptions are not repeated in their entirety.

At block 602, a server repository is accessed at a URL. The URL may be preloaded or the UEFI may provide an interface to allow a user to enter a URL to a script repository on a server. Whether the URL is a statically-defined resource identifier or user-provided via an interface, the repository is accessed and a script is selected from the server repository and downloaded to the target device at block 604. The script may be selected from a plurality of scripts, where there may be a script associated with a particular device profile. In that example, a script may be selected by an authentication engine, such as authentication engine 102 of FIG. 1, based on a device profile of the target device.

At block 610, a function call of the script is identified as associated with a control program. For example, the UEFI system may include a language interpreter that links a control program to particular function calls using a lookup table, a dictionary, or other mapping mechanism. The corresponding control program(s) may be executed, concurrently with execution of the script at block 612. For example, a control program may be caused by an environment engine (e.g., environment engine 102 of FIG. 1) to execute to monitor the script during execution of the script, such as monitoring resource usage of the function calls of the script.

At block 616, the script is terminated in response to a determination that an event occurred that indicates a functionality requested is to perform beyond a threshold. For example, as the control program monitors the execution environment, the control program can restrict access by terminating a function of the script or terminate the script all together when a resource usage threshold is achieved. In this manner, a script may be executed by the UEFI system without, for example, misuse of resources, such as by malicious code.

The script program may, for example, allow accessing many internal UEFI functionalities and data, like the user interface (UI), UEFI driver loading/unloading mechanisms, executing internal API commands, reading and writing UEFI environment variables and others, which makes possible for support personnel and/or the end users to program powerful control actions in a system, such as starting UEFI applications for system diagnosis, executing hardware inventory, downloading system log files, checking operating system integrity, reading or changing registry values, adding screens and items in UEFI configuration interface, upgrading the own UEFI, and the like. For example, an information technology (IT) company may release scripts that execute UEFI functions, such as system identification, diagnosis and troubleshooting before the main operating system is loaded, and send the results back to the IT company for analysis The remote loading of the scripts may, for example, allow for simultaneous management of multiple systems to execute dynamic programming logic to select which actions each system will execute by the UEFI system.

Although the flow diagrams of FIGS. 4-6 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract and drawings), and/or all of the elements of any method or process so disclosed, may be combined in any combination, except combinations where at least some of such features and/or elements are mutually exclusive.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A system comprising:
an authentication engine comprising circuitry to determine a source of a script and an integrity level of the script;
a primitives engine comprising circuitry to enable a plurality of primitives to use with the script, the plurality of primitives to define functionalities available via a unified extensible firmware interface (UEFI) system; and
an environment engine comprising circuitry to:
enable execution of the script during initialization of a target device in response to a determination that the script is authenticated based on the source and the integrity level; and
establish execution parameters of the script by the UEFI system based on thresholds defined by a plurality of control programs.

2. The system of claim 1, wherein:
the authentication engine is to download the script from a server repository; and
the environment engine is to restrict execution of the script to the functionalities of the plurality of primitives.

3. The system of claim 2, wherein the authentication engine is to:
provide a first interface to designate a uniform resource identifier of the server repository; and
provide a second interface to designate a non-volatile memory resource to store the script.

4. The system of claim 1, wherein the environment engine further comprises:
an interpreter engine comprising circuitry to analyze script content; and
an execution engine comprising circuitry to execute the script in a runtime environment with the plurality of control programs executing to check operation of the script during runtime to be within resource usage parameters represented by the thresholds.

5. The system of claim 4, wherein:
the interpreter engine is to identify a function call that is not a functionality of the plurality of primitives; and
the execution engine is to forbid execution of the script in response to a determination that the script contains the function call.

6. A non-transitory computer-readable storage medium comprising a set of instructions executable by a processor resource to:
authenticate a script source against a digital certificate;
interpret a script to run on a set of primitives, the set of primitives to represent functionalities available via a unified extensible firmware interface (UEFI) system;
execute the script via the UEFI system according to a plurality of thresholds associated with the set of primitives in response to a determination that the script achieves an integrity level; and
check, via the UEFI system, events produced by execution of the script to identify that the script is executing within limits defined by the plurality of thresholds.

7. The medium of claim 6, wherein the set of instructions is executable by the processor resource to:
determine a uniform resource locator (URL) from a statically-defined identifier or a user-provided identifier; and
download the script from a server repository via the URL.

8. The medium of claim 7, wherein the set of instructions is executable by the processor resource to:

select the script to download from the server repository based on a target device profile, the target device profile containing a configuration identifier of a target device;

check the script source by using a public encryption key against the digital certificate; and cancel a download operation of the script in response to a determination that the script source is not authenticated.

9. The medium of claim 6, wherein the set of instructions is executable by the processor resource to:

terminate, via the UEFI system, execution of the script in response to a determination that an event occurred that indicates a functionality is requested to perform beyond the thresholds.

10. The medium of claim 6, wherein the set of instructions is executable by the processor resource to:

identify a function call of the script to be performed in response to a particular UEFI event; and execute the function call in response to the particular UEFI event.

11. An apparatus compatible with a unified extensible firmware interface (UEFI) system comprising:

a processor resource;

a non-transitory computer readable storage device comprising a set of instructions executable by the processor resource to cause the UEFI system to:

verify an integrity status of a script file and authenticity status of the script file using a public encryption key, the script file representing a script executable on the UEFI system;

analyze, via a language interpreter, contents of the script file in response to a determination that the script file is authentic;

establish a threshold on execution of the script file based on the analysis of the contents; and execute a control program concurrent with execution of the script, the control program to implement the threshold.

12. The apparatus of claim 11, wherein the set of instructions is executable by the processor resource to cause the UEFI system to:

check whether a uniform resource locator (URL) to a remotely located repository exists on the apparatus; and retrieve a script file from the repository at the URL using a transfer protocol.

13. The apparatus of claim 11, wherein the set of instructions is executable by the processor resource to cause the UEFI system to:

determine whether a file hash of the script is authentic; and prevent the apparatus from executing the script in response to a determination that the file hash is not authentic.

14. The apparatus of claim 11, wherein the set of instructions is executable by the processor resource to cause the UEFI system to:

deny execution of an operation of the script file in response to a determination that the operation is to perform outside a parameter of execution; and deny execution of the operation of the script file in response to a comparison of the operation to a list of primitives allowable by the UEFI system.

15. The apparatus of claim 1, wherein the set of instructions is executable by the processor resource to cause the UEFI system to:

enable the language interpreter to access a UEFI application programming interface; and execute the language interpreter to identify whether a set of actions of the script file match a device profile of the apparatus.

* * * * *